UNITED STATES PATENT OFFICE.

AUGUST LEOPOLD LASKA, OF OFFENBACH-ON-THE-MAIN, GERMANY, ASSIGNOR TO CORPORATION CHEMISCHE FABRIK GRIESHEIM-ELEKTRON, OF FRANKFORT-ON-THE-MAIN, GERMANY.

DISAZO DYE.

964,920.   Specification of Letters Patent.   Patented July 19, 1910.

No Drawing.   Application filed April 13, 1910.   Serial No. 555,285.

*To all whom it may concern:*

Be it known that I, AUGUST LEOPOLD LASKA, doctor of philosophy, chemist, a subject of the German Emperor, and resident of Offenbach-on-the-Main, in the Grand Duchy of Hesse, Germany, (with the post-office address Gerberstrasse 5,) have invented new and useful Improvements in Disazo Dyestuffs, of which the following is a specification.

My invention relates to the production of disazo dyestuffs especially suited for the preparation of pigment colors.

The process consists in combining the tetrazo composed of dichlorodiaminodiphenolalkylethers having the formula:

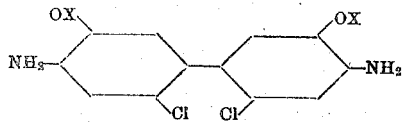

wherein X means an alkyl group with naphthol derivatives of the general constitution:

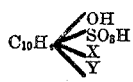

wherein X means H, Cl or an acidylamino group and Y=H or $SOH_3$. Among alkylethers of the dichlorodiaminodiphenol may be used for instance dichlorodianisidin and dichlorodiphenetidin.

These disazo dyestuffs can be transformed in pigment colors in the usual manner. These show very clear bluish-red to blue-violet shades of good fastness.

The following examples will show how the new coloring matter can be obtained; parts being by weight:

Example I: 15.6 parts of dichlorodianisidin are diazotized by means of 6.9 parts of sodium nitrite and the necessary quantity of hydrochloric acid. The resulting solution, which if necessary may be filtered, is introduced into an ice cold solution of 36 parts of 2 naphthol 3:6 disulfonic acid (disodium salt). The mixture is kept alkaline by addition of sodium carbonate until the combination is complete. The temperature is then raised to 70° and the dyestuff precipitated by addition of common salt, filtered off and dried. It forms a black-brown powder, dissolving in concentrated sulfuric acid with blue, in water with violet color. By its reduction with stannous chlorid and hydrochloric acid dichlorodianisidin and aminonaphtholdisulfonic acid are obtained. The dyestuff produces clear reddish-violet color lakes.

Example II: 15.6 parts of dichlorodianisidin are diazotized in the aforesaid manner. The resulting tetrazo solution, which if necessary may be filtered, is poured into a solution of 35 parts of 1 naphthol 3:8 disulfonic acid (acid sodium salt), which is kept alkaline by addition of soda during the combination process. The temperature is then raised to 70°, the dyestuff precipitated by addition of common salt, filtered off and dried. It forms a black-brown powder dissolving in concentrated sulfuric acid with blue, in water with bluish-red color. By its reduction with stannous chlorid and hydrochloric acid dichlorodianisidin and aminonaphtholdisulfonic acid are obtained. The dyestuff produces clear violet color lakes.

The dyestuff obtained from two molecules of 1 naphthol 3:6 disulfonic acid produces bluish-red to bordeaux-red pigment colors.

The analogous combinations with 1 acetylamino 8 naphthol-3:6 disulfonic acid respectively with 1 benzoylamino 8 naphthol 3:6 disulfonic acid produce red-violet respectively blue-violet color lakes.

The dyestuff from dichlorodianisidin and 1 chloro 8 naphthol 3:6 disulfonic acid can be transformed in violet color lakes.

In analogous manner may be performed the combinations with naphtholmonosulfonic acids, for instance with 1:3—1:4—1:5 —2:6—2:7 naphtholsulfonic acid.

Now what I claim and desire to secure by Letters Patent is the following:

1. The process for the production of disazo coloring matter, especially suited for the preparation of pigment colors, consisting in combining the tetrazo compound of dichlorodiaminodiphenolalkylethers of the aforesaid constitution with naphthol derivatives of the general formula:

wherein X means a hydrogen atom, a chlorin atom and an acidylamino group, and Y a hydrogen atom and a sulfonic group.

2. As new articles the dyestuffs which can be obtained by combining the tetrazo compound of dichlorodiaminodiphenolalkylethers of the aforesaid constitution with naphthol derivatives of the general formula:

$$C_{10}H_4OH.SO_3H.X.Y$$

wherein X means a hydrogen atom, a chlorin atom and an acidylamino-group, and Y a hydrogen atom and a sulfonic group, which dyestuffs dissolve in water in form of their alkali salts with bluish-red to violet-red color, in concentrated sulfuric acid with blue color, which yield dichlorodiaminodiphenolalkylethers and aminonaphthol derivatives by reduction with stannous chlorid and hydrochloric acid, and which can be transformed into bluish-red to blue violet pigment colors.

3. The process for the production of disazo coloring matter, especially suited for the preparation of pigment colors, consisting in combining the tetrazo compound of dichlorodianisidin of the aforesaid constitution with naphthol derivatives of the general formula:

$$C_{10}H_4OH.SO_3H.X.Y$$

wherein X means a hydrogen atom, a chlorin atom and an acidylamino group, and Y a hydrogen atom and a sulfonic group.

4. As new articles, the dyestuffs which can be obtained by combining the tetrazo compound of dichlorodianisidin of the aforesaid constitution with naphthol derivatives of the general formula:

$$C_{10}H_4OH.SO_3H.X.Y$$

wherein X may be a hydrogen atom, a chlorin atom and an acidylamino group, and Y a hydrogen atom and a sulfonic group, which dyestuffs dissolve in water in form of their alkali salts with bluish-red to violet-red, in concentrated sulfuric acid with blue color, which yield dichlorodianisidin and aminonaphthol derivatives by reduction with stannous chlorid and hydrochloric acid, and which can be transformed into bluish-red to blue violet pigment colors.

In testimony, that I claim the foregoing as my invention, I have signed my name in presence of two witnesses, this second day of April, 1910.

AUGUST LEOPOLD LASKA.

Witnesses:
  HERMANN WEIL,
  KATHINKA PFEIFFER.